United States Patent
Yamauchi (10) Patent No.: US 9,092,035 B2
(45) Date of Patent: Jul. 28, 2015

(54) INTERNAL PILOT TYPE PRESSURE REGULATOR

(75) Inventor: Takeshi Yamauchi, Tokyo (JP)

(73) Assignee: Koganei Corporation, Tokyo (JP)

( * ) Notice: Subject to any disclaimer, the term of this patent is extended or adjusted under 35 U.S.C. 154(b) by 0 days.

(21) Appl. No.: 14/113,887

(22) PCT Filed: Dec. 15, 2011

(86) PCT No.: PCT/JP2011/079104
§ 371 (c)(1),
(2), (4) Date: Nov. 19, 2013

(87) PCT Pub. No.: WO2012/147234
PCT Pub. Date: Nov. 1, 2012

(65) Prior Publication Data
US 2014/0174563 A1   Jun. 26, 2014

(30) Foreign Application Priority Data
Apr. 27, 2011   (JP) .................................. 2011-100074

(51) Int. Cl.
*F16K 31/12*   (2006.01)
*G05D 16/06*   (2006.01)
(Continued)

(52) U.S. Cl.
CPC .......... *G05D 16/0636* (2013.01); *F16K 31/365* (2013.01); *F16K 35/02* (2013.01); *G05D 16/0661* (2013.01)

(58) Field of Classification Search
CPC ........... G05D 16/0636; G05D 16/0661; F16K 17/10; F16K 35/06
USPC ........... 137/489, 489.5, 429.5, 553, 505–510; 251/45, 46, 28
See application file for complete search history.

(56) References Cited

U.S. PATENT DOCUMENTS

| 648,591 A | * | 5/1900 | Metzger | ......................... 137/382 |
| 2,487,089 A | * | 11/1949 | Anthes | ........................ 137/489.5 |

(Continued)

FOREIGN PATENT DOCUMENTS

| CN | 1206083 | 1/1999 |
| JP | 854935 A | 2/1996 |

(Continued)

OTHER PUBLICATIONS

Ohmsa, Ltd., Japan Hydraulics and Pneumatics Association, "Hydraulics and Pneumatics Handbook (New Edition)", pp. 461-465, Feb. 25, 1989.

(Continued)

*Primary Examiner* — Jessica Cahill
(74) *Attorney, Agent, or Firm* — McCormick, Paulding & Huber LLP (57) ABSTRACT

An internal pilot type pressure regulator 10 reduces a pressure of compressed air supplied to a primary port 11 and causes it to flow out to a secondary port 12. The pressure of air which flows into the secondary port 12 is set by rotating a handle 61 so as to adjust a spring force which is added to a pilot diaphragm 49. When a bonnet 47, into which the pilot diaphragm 49 and a pressure regulating member 59 are incorporated, is inserted in a pressure regulating adapter 28 and then rotated, an outward projecting portion 71 abuts on an inward projecting portion 73 and is mounted. When a lock member 77 is inserted between the outward projecting portion 71 and the inward projecting portion 73, the pressure regulating adapter 28 is locked.

7 Claims, 9 Drawing Sheets

(51) Int. Cl.
*F16K 31/365* (2006.01)
*F16K 35/02* (2006.01)

(56) References Cited

U.S. PATENT DOCUMENTS

| | | | | |
|---|---|---|---|---|
| 2,553,347 | A * | 5/1951 | Work | 236/80 R |
| 2,805,039 | A * | 9/1957 | Angelery | 251/38 |
| 5,056,550 | A * | 10/1991 | Mooney | 137/270 |
| 5,271,601 | A * | 12/1993 | Bonzer et al. | 251/61.1 |
| 6,068,014 | A | 5/2000 | Tomita | |
| 6,354,319 | B1 * | 3/2002 | Mooney | 137/14 |
| 6,554,017 | B2 * | 4/2003 | Berger | 137/116.5 |
| 6,604,538 | B2 * | 8/2003 | Schmotzer et al. | 137/1 |
| 2005/0139268 | A1 * | 6/2005 | Kremer et al. | 137/553 |
| 2009/0199523 | A1 * | 8/2009 | Hilberer | 55/385.3 |
| 2011/0162737 | A1 * | 7/2011 | Yamauchi | 137/561 R |

FOREIGN PATENT DOCUMENTS

| | | | |
|---|---|---|---|
| JP | 8286765 | A | 11/1996 |
| JP | 10268943 | A | 10/1998 |
| JP | 2001208239 | A | 8/2001 |
| WO | WO 2010035323 | A1 * | 4/2010 |

OTHER PUBLICATIONS

International search report for PCT/JP2011/079104 dated Jan. 4, 2012.
Chinese Office Action dated Aug. 5, 2014. Application 201180070431x.

* cited by examiner

INTERNAL PILOT TYPE PRESSURE REGULATOR

TECHNICAL FIELD

The present invention relates to an internal pilot type pressure regulator having a pilot pressure chamber into which a primary pressure in introduced.

BACKGROUND ART

A pressure regulator, which is also referred to as "regulator", is used for regulating a pressure of compressed air which is supplied from an air pressure source to be a specified pressure, and for supplying the regulated air to a pneumatic equipment such as pneumatic cylinder. This pressure regulator has, for example, as disclosed in Patent Document 1 and Non-patent document 1, a main valve body opening and closing a communication hole through which a primary port to which compressed air is supplied and a secondary port to which a pneumatic equipment is connected communicate with each other, and a spring force for closing the communication hole is supplied by a main valve spring member to the main valve body. The pressure regulator has a diaphragm for partitioning and forming a secondary pressure chamber to which a pressure of the secondary port is supplied, and a main valve shaft provided with the main valve body abuts on the diaphragm.

A pressure regulator in which the diaphragm is directly driven by a pressure regulating spring member in an axial direction of the main valve body acts as "direct acting type pressure regulator". In this direct acting type pressure regulator, an inner space is partitioned into a secondary pressure chamber and an atmospheric pressure chamber by the diaphragm, and the diaphragm is formed with a relief hole. The relief hole is closed by causing a tip end of the main valve shaft to abut on the diaphragm, and a spring force is applied to the diaphragm in a direction to open the main valve body via the main valve shaft by the pressure regulating spring member. When the pressure of the secondary port drops below a set value, the diaphragm is displaced by the spring force of the pressure regulating spring member. At this moment, the main valve shaft is dislocated by the dislocation of the diaphragm, and the main valve body releases the communication hole. Then, compressed air of the primary port is discharged to the secondary port. When the pressure of the secondary port becomes equal to a set pressure, the diaphragm is displaced in a direction to detach from the main valve body by the pressure of compressed air which is applied to the diaphragm. As a result, the main valve body closes the communication hole.

In the above-described direct acting type pressure regulator, a total of the secondary pressure which is applied to the diaphragm, a primary pressure which is applied to the main valve body, and a spring force of the main valve spring member is applied as a thrust in a direction to close the main valve body. On the other hand, a total of the spring force of the pressure regulating spring member and the pressure of the secondary port, which is applied to the valve body, is applied as a thrust in a direction to open the main valve body.

PRIOR ART DOCUMENTS

Patent Documents

Patent Document 1: Japanese Patent Laid-Open Publication No. 10-268943

Non-Patent Documents

Non-patent Document 1: Japan Hydraulics and Pneumatics Association; "Hydraulics and Pneumatics Handbook (New edition)", Ohmsha, Ltd., pp. 461-465 (Feb. 25, 1989)

DISCLOSURE OF THE INVENTION

Problems to be Solved by the Invention

In addition to the above-described direct active type, an internal pilot type, in which air in a primary port is used as a pilot pressure, is known as another type. In the pressure regulator of this type, the direct active type pressure regulator is incorporated as a pilot valve, and the pressure regulator has a main valve diaphragm which partitions and forms a secondary pressure chamber and an internal pilot chamber, and a main valve shaft abuts on the main valve diaphragm. The pressure regulator of this type further has a pilot diaphragm, which regulates the pressure supplied to the internal pilot chamber in accordance with the pressure of air in the primary port. Therefore, the internal pilot pressure regulator provided with a main valve diaphragm and a pilot diaphragm can enhance a flow rate characteristic thereof in comparison with that of a direct active type pressure regulator. The flow rate characteristic can be shown by a graph showing a secondary flow rate by a horizontal axis and showing a secondary pressure by a vertical axis. It is preferable that the secondary pressure be maintained at a constant value the same as a set pressure even when the secondary flow rate is increased. In practice, the secondary pressure tends to be reduced along with increase of the secondary flow rate; however, there is a secondary flow rate range in which the secondary pressure is not largely reduced even when the secondary flow rate is increased, and the pressure regulator is normally used in this range.

The internal pilot type pressure regulator has two diaphragms, and the pilot diaphragm is incorporated in a bonnet of a case body of the pressure regulator. There is a mode in which the bonnet is attached to an adapter serving as the case body by using screw members, and a mode in which the bonnet is attached so that a male thread formed on the outer peripheral surface of the bonnet is screwed and coupled with a female thread of an adapter serving as the case body. Therefore, in the mode in which the plurality of screw members are used, the operation of fixing the bonnet to the adapter by screwing is inevitable upon assembling of the pressure regulator, and the plurality of screws have to be loosened to detach the bonnet from a housing upon replacement of the pilot diaphragm. In the mode in which the bonnet is screwed and coupled with the case body, the bonnet has to be rotated many times, and attachment/detachment of the bonnet takes time. Therefore, the conventional pressure regulators encounters such a problem that the assembling workability and the replacing workability of the pilot diaphragm of the internal pilot type pressure reducing valve are short in comparison with those of the direct active type pressure regulator.

It is an object of the present invention to improve an assembling workability of the internal pilot type pressure regulator and a replacing workability of the diaphragm.

Means for Solving the Problems

An internal pilot type pressure regulator according to the present invention comprises: a port block which is formed with: a primary port to which compressed air is supplied; and a secondary port which communicates with the primary port via a first communication hole, pressure-regulated compressed air flowing out from the secondary port, wherein a main valve shaft provided with a main valve body which opens and closes the first communication hole is mounted in the first communication hole so as to be movable in an axial direction thereof; a pressure regulating adaptor which is detachably mounted on the port block, wherein a main valve diaphragm partitioning and forming a secondary pressure chamber communicating with the secondary port and a pilot pressure chamber on the other side is fixed between the pressure regulating adaptor and the port block; a bonnet which is provided with a cylindrical portion, wherein the bonnet is detachably mounted on a cylindrical mounting portion of the pressure regulating adaptor, a pilot diaphragm opening and closing a pilot valve body opening and closing a second communication hole causing the pilot pressure chamber and the primary port to communicate with each other, and a pressure regulating spring member regulating the pilot pressure in the pilot pressure chamber are incorporated in the cylindrical portion; an outward projecting portion which is provided on an outer peripheral surface of the cylindrical portion so as to project in a radially outward direction; an inward projecting portion which is provided so as to project in the cylindrical mounting portion, wherein when the bonnet is inserted in the pressure regulating adaptor in an axial direction thereof and then rotated, the inward projecting portion abuts on the outward projecting portion; and a lock member which is inserted in a gap with the outward projecting portion abutting on the inward projecting portion, wherein the gap is defined by a stopper provided on an inner surface of the cylindrical portion, the outward projecting portion, the cylindrical mounting portion, and the cylindrical portion.

The internal pilot type pressure regulator according to the present invention comprises an annular fall preventing member which prevents the lock member from being moved and falling in the axial direction. In the internal pilot type pressure regulator according to the present invention, the bonnet is provided with the two outward projecting portions, the pressure regulating adaptor is provided with the two inward projecting portions corresponding to the number of the outward projecting portions, and when approximately one-quarter rotation of the bonnet is performed after inserting the bonnet in the pressure regulating adaptor, the outward projecting portions abut on the respective inward projecting portions. In the internal pilot type pressure regulator according to the present invention, the bonnet is provided with an adjusting screw member which is screwed and coupled to a spring receiving member retaining the pressure regulating spring member between the spring receiving member and the pilot diaphragm, and which is rotatably with respect to the bonnet; a handle, which has an end wall portion fitted to the adjusting screw member and a cylindrical portion covering an outer periphery of the bonnet, is mounted on an outside of the bonnet so as to be reciprocable between a lock position and a rotation position in the axial direction, wherein when the handle is pushed against the bonnet in the axial direction at the lock position, the handle is engaged with the bonnet to prevent rotation of the handle, and when the handle is pulled from the bonnet in the axial direction at the rotation position, the handle is rotatable, and a handle-position indicating member, which is exposed to an outside when the handle is at the rotation position and which is covered with the handle when the handle is at the lock position, is provided on the outer peripheral surface of the bonnet.

Effects of the Invention

In the pilot pressure regulator according to the present invention, when the bonnet provided with the pilot diaphragm and the pressure regulating spring member is inserted in the pressure regulating adapter and rotated by an angle less than one rotation, the projecting portions abut on the stoppers, and the bonnet is attached to the pressure regulating adapter. When the lock members are inserted between the bonnet and the pressure regulating adapter, rotation of the bonnet is prevented. In this manner, the bonnet can be attached to the pressure regulating adapter by a simple operation, and detached from the pressure regulating adapter by a simple operation. The assembling workability of the internal pilot type pressure regulator and the replacing workability of the diaphragm can be improved by simple operations. The lock members can be prevented from falling by the fall preventing member.

BEST MODE FOR CARRYING OUT THE INVENTION

Figure 3:
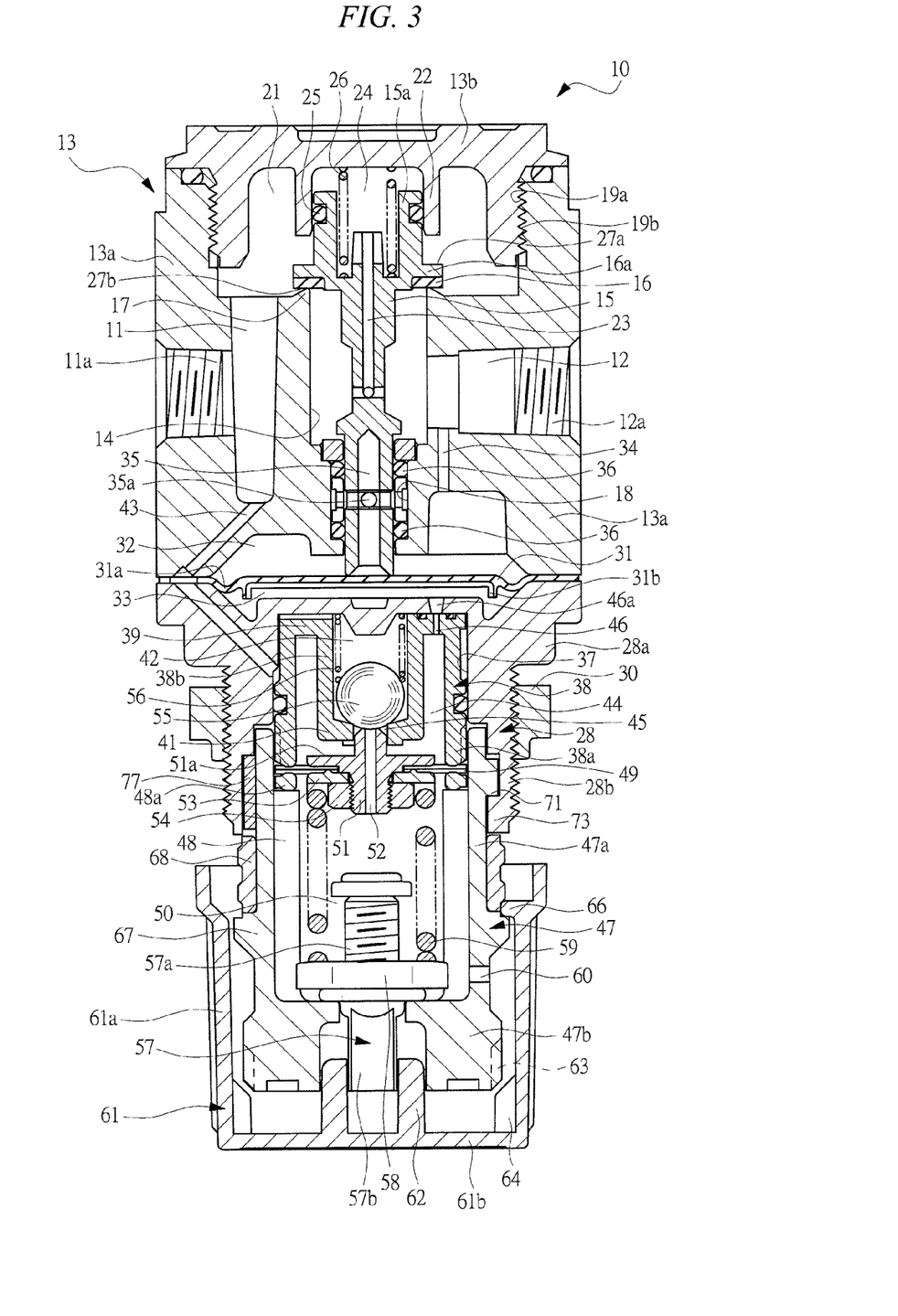
FIG. 3 is an enlarged sectional view taken along the line 3-3 in FIG. 1.

Hereinafter, one embodiment of the present invention will now be explained in details with reference to the drawings. An internal pilot type pressure regulator 10 has, as shown in FIG. 3, a block main body 13a formed with: a primary port 11 to which compressed air is supplied via a primary piping from an air supply (not shown); and a secondary port 12 which is connected to a pneumatic equipment via a secondary piping. The primary port 11 is formed with a screw hole 11a for thread connection to the primary piping, and the secondary port 12 is formed with a screw hole 12a for thread connection to the secondary piping. The block main body 13a is formed with the screw holes 11a and 12a in a state where they are axially aligned with each other, and they open on outer surfaces opposite to each other in the block main body 13a. A central portion of the block main body 13a is formed with a communication hole 14 which extends in an axial direction as a direction perpendicular to each of the screw holes 11a and 12a, and the primary port 11 communicates with the secondary port 12 via the communication hole 14 (the first communication hole). An air flow portion which extends from the primary port 11 to the secondary port 12 via the communication hole 14 constitutes a main flow path portion of the pressure regulator.

A main valve shaft 15 is mounted in the communication hole 14 and movable in an axial direction. A flange portion 16a larger in diameter than an inner diameter of the communication hole 14 is provided to one end portion side of the main valve shaft 15, and a main valve body 16 which is made of rubber and which abuts on a main valve seat 17 formed at an opening portion on a communicating side of the communication hole 14 is provided at the flange portion 16a. The other end portion of the main valve shaft 15 is slidably fitted into a guide hole 18 formed in the block main body 13a. The guide hole 18 has a diameter smaller than that of the communication hole 14 in order to reduce its sliding friction.

A female screw 19a is formed on an open end portion of the block main body 13a, and a cover 13b having a male screw 19b for thread connection to this female screw 19a is mounted to the block main body 13a. The cover 13b and the block main body 13a constitute a port block 13. A primary chamber 21 is formed in the port block 13 so as to communicate with the primary port 11, and the communication hole 14 communicates with the primary port 11 via the primary chamber 21. The cover 13b is formed with a cylindrical guide body 22, a cylindrical sliding portion 15a provided to one end portion of the main valve shaft 15 is slidably fitted to the cylindrical guide body 22. A communication flow path 23 is formed in the main valve shaft 15. This communication flow path 23 opens on one end surface of the main valve shaft 15, and communicates with the secondary port 12. Pressure of the secondary port 12 is supplied via the communication flow path 23 to a balance chamber 24 formed in the cylindrical guide body 22 by the cylindrical guide body 22 and one end surface of the main valve shaft 15. The balance chamber 24 is sealed with respect to the primary port 11 by a sealing material 25 which is mounted in an annular groove of the sliding portion 15a.

A main valve spring member 26 composed of a compression coil spring is mounted in the sliding portion 15a of the balance chamber 24, one end of the main valve spring member 26 abuts on the cover 13b, and the other end abuts on the main valve shaft 15. The main valve spring member 26 applies a force to the main valve shaft so as to press the main valve body 16 towards the main valve seat 17, and to close the communication hole 14. As a force to be applied in the axial direction of the main valve shaft 15 from the primary chamber 21, a force to be applied to the flange portion 16a in a downward direction in this figure, that is, a thrust to be applied to a primary pressure receiving portion 27a. Furthermore, a force to be applied to the flange portion 16a in an upward direction in this figure, that is, a thrust to be applied to an opposite pressure receiving portion 27b provided on an opposite side of the primary pressure receiving portion 27a the side being one on which the main valve body 16 are defined. These thrusts are substantially cancelled since pressure receiving areas of the thrusts are substantially the same as each other. Since the balance chamber 24 is substantially the same in inner diameter as the communication hole 14, that is, their pressure receiving areas are substantially the same as each other, a thrust to be applied to the main valve shaft 15 in a direction of closing the main valve body 16 via the secondary pressure of the balance chamber 24, and a thrust to be applied to the main valve shaft 15 in a direction of opening the main valve body 16 via the secondary pressure of the secondary port 12 become substantially equal to each other, so that they are cancelled.

As above, since axial thrusts of the main valve shaft 15 by the primary pressure and the secondary pressure are substantially cancelled, a force to be applied in the axial direction of the main valve shaft 15 becomes equal to the spring force of the main valve spring member 26.

Figure 1:
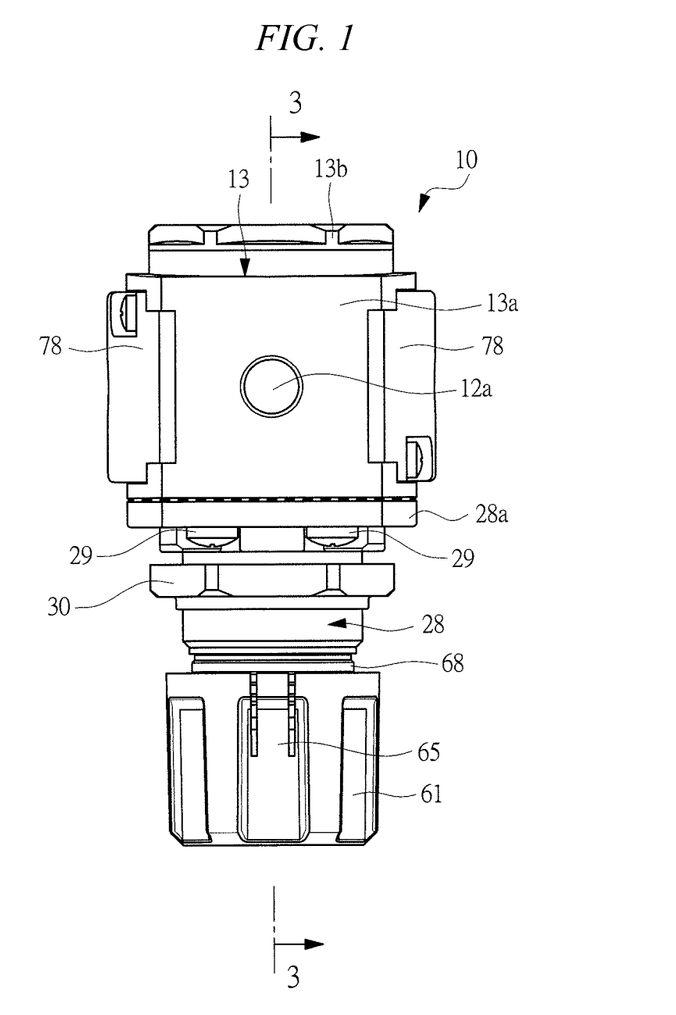
FIG. 1 is a front view of an internal pilot type pressure regulator according to one embodiment of the present invention.
Figures 2A, 2B:
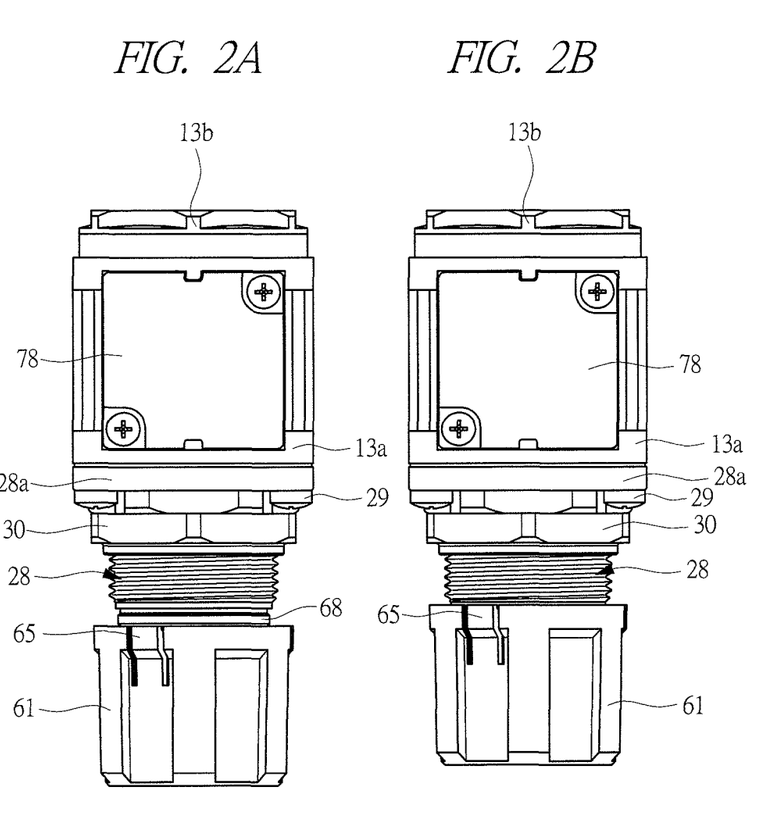
FIGS. 2A and 2B are side views of the pressure regulator shown in FIG. 1.
Figure 5:
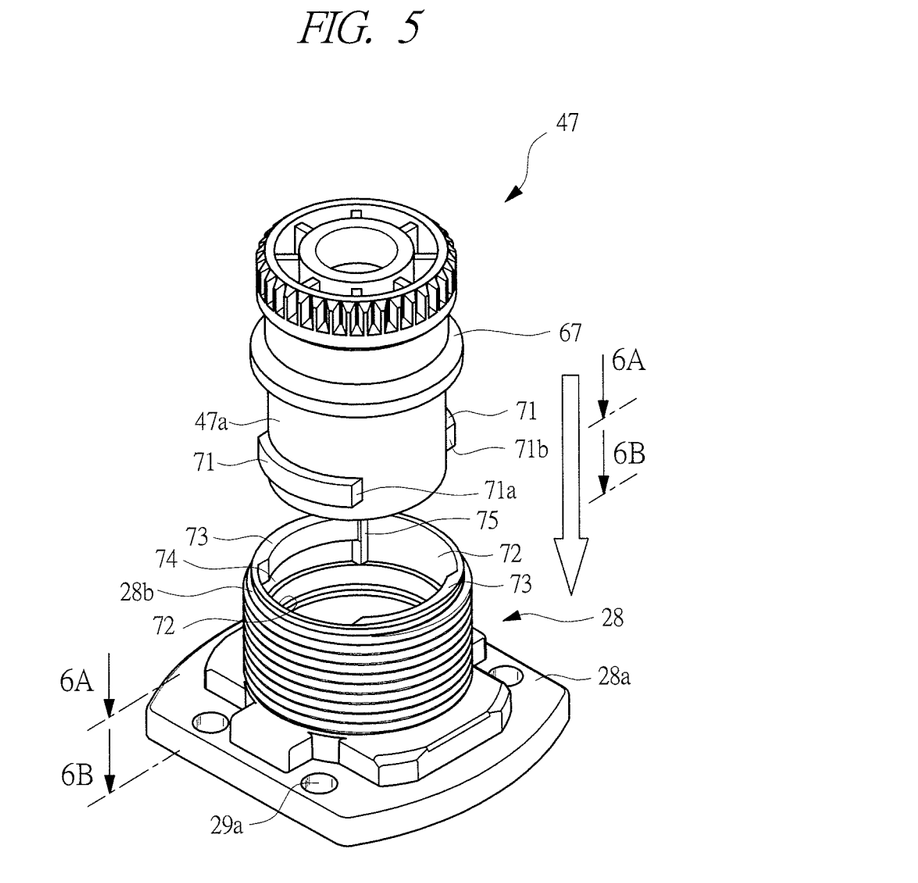
FIG. 5 is a perspective view showing a pressure regulating adapter of the pilot type pressure regulator and the bonnet before the bonnet is inserted in the pressure regulating adapter.

The block main body 13a is mounted with a pressure regulating adaptor 28 having a flange portion 28a and a cylindrical mounting portion 28b. As shown in FIGS. 1 and 2, the pressure regulating adaptor 28 is fastened to the block main body 13a of the port block 13 via the flange portion 28a by four screw members 29, and freely detachable. As shown in FIG. 5, the flange portion 28a is provided with mounting holes 29a through which the respective screw members 29 are introduced. A main valve diaphragm 31 is sandwiched and fixed between the block main body 13a and the pressure regulating adaptor 28. The main valve diaphragm 31 has an elastic deforming portion 31a made of rubber, and a reinforcing disk 31b made of metal or resin and fixed to the main valve diaphragm 31.

For mounting the internal pilot type pressure regulator 10 to a member which is not shown in the drawing, the cylindrical mounting portion 28b of the pressure regulating adaptor 28 is formed with a male screw, and as shown in FIG. 2, the male screw is for thread connection to a nut 30.

Concave portions are respectively formed on a mounting end surface of the block main body 13a and a mounting end surface of the pressure regulating adaptor 28, and an inner space is partitioned, by the main valve diaphragm 31 disposed between the block main body 13a and the pressure regulating adaptor 28, into a secondary pressure chamber 32 formed in the concave portion of the block main body 13a and a pilot pressure chamber 33 formed in the concave portion of the pressure regulating adaptor 28. The secondary pressure chamber 32 communicates with the secondary port 12 via a communication hole 34 formed in the block main body 13a, and pressure in the secondary pressure chamber 32 is equal to a secondary pressure the same as that of the secondary port 12. An abutting end surface of the main valve shaft 15 abuts on the main valve diaphragm 31, and this abutting end surface has a seal structure. When the pressure in the secondary pressure chamber 32 becomes less than the pressure in the pilot pressure chamber 33, the main valve diaphragm 31 is elastically deformed upward in the drawing, and the main valve shaft 15 is displaced in an axially-upward direction while the abutting end surface of the main valve shaft 15 maintains the sealed condition. On the contrary, when the pressure in the secondary pressure chamber 32 exceeds the pressure in the pilot pressure chamber 33, the main valve diaphragm 31 elastically deforms downward in the drawing. When the main valve diaphragm 31 further deforms elastically downward in the drawing, since the main valve body 16 abuts on the main valve seat 17, the main valve shaft 15 is not displaced further downward, and the abutting end surface of the main valve shaft 15 is separated from the main valve diaphragm 31, so that the sealing of the abutting end surface is released.

When compressed air is supplied to the pneumatic equipment via the secondary piping connected to the secondary port 12, pressure in the secondary pressure chamber 32 is reduced. As a result, the main valve diaphragm 31 is deformed towards the main valve shaft 15 by the pilot pressure in the pilot pressure chamber 33 so that the main valve body 16 separates from the main valve seat 17. In this manner, compressed air of the primary pressure is supplied from the primary port 11 to the secondary port 12 so as to increase the pressure of the secondary port 12. When the secondary pressure is increased, the main valve diaphragm 31 is elastically deformed downward in the drawing against the pilot pressure so that the main valve shaft 15 is displaced downward in the drawing. Therefore, the main valve body 16 contacts and seals the main valve seat 17 as shown in FIG. 3 so as not to supply compressed air to the secondary port 12. In this manner, the pressure of the secondary port 12 is returned to the set value.

An exhaust hole 35 is formed in the other end portion of the main valve shaft 15 so as to open on the other end surface which abuts on the main valve diaphragm 31, an inside end of the exhaust hole 35 opens into the guide hole 18 via a communication hole 35a extending in a radial direction. Seal members 36 are provided in the guide hole 18 and respectively located at axial ends of the guide hole 18, seal members 36 are provided in the guide hole 18 and respectively located at axial ends of the guide hole 18 in relation to the communication hole 35a, and the block main body 13a is formed with an exhaust hole (not shown) which has an opening formed between the seal members 36, and which causes the exhaust hole 35 to communicate with the outside. Therefore, when the pressure of the secondary pressure chamber 32 exceeds the pressure of the pilot pressure chamber 33, and the main valve diaphragm 31 elastically deforms in a direction of separating from the main valve shaft 15, air in the secondary pressure chamber 32 is discharged to the outside via the exhaust hole 35. For example, when a driving equipment provided on the secondary of the pressure regulator pushes a work in an assembly line of electronic parts which utilizes a pneumatic equipment, the pressure of the secondary port temporally exceeds pressure in the pilot pressure chamber, therefore, compressed air in the secondary piping is discharged to the outside via the exhaust hole 35.

A valve holder 38 is assembled in a housing hole 37 formed in the pressure regulating adaptor 28. This valve holder 38 has: a cylindrical large diameter body 38a which is fitted in the housing hole 37; and a cylindrical small diameter body 38b which is disposed so as to form a clearance gap between the cylindrical large diameter body and itself. An end wall portion 39 is coupled to a base end portion of the cylindrical large diameter body 38a and a base end portion of the cylindrical small diameter body 38b, and faces a bottom surface of the pressure regulating adaptor 28, and a valve seat portion 41 is provided at a tip end portion of the cylindrical small diameter body 38b to face towards the bottom surface of the pressure regulating adaptor 28. A pilot flow path 43 is provided so as to pass through the port block 13, the pressure regulating adaptor 28 and an end portion of the main valve diaphragm 31. The pilot flow path 43 further communicates with a valve chamber 42 provided in the cylindrical small diameter body 38b and the primary port 11. A communication chamber 44 is formed between the cylindrical large diameter body 38a and the cylindrical small diameter body 38b. When a pilot valve body 55 (which will be described later) is not seat on the valve seat of the valve seat portion 41, this communication chamber 44 communicates with the valve chamber 42 via a clearance gap formed between a communication hole 45 (second communication hole) formed in the valve seat portion and a stem 51 (which will be described later). The communication chamber 44 constantly communicates with the pilot pressure chamber 33 via a communication hole 46 formed in the end wall portion 39 and a communication hole 46a formed in the pressure regulating adaptor 28.

A bonnet 47 is attached to the pressure regulating adaptor 28 in a detachable manner. This bonnet 47 has a cylindrical portion 47a which is fitted to the cylindrical mounting portion 28b of the pressure regulating adaptor 28, and an end wall portion 47b provided to an end portion of the cylindrical portion 47a, and the cylindrical portion 47a is fitted to the outside of the valve holder 38. A plurality of projecting portions 48 projecting in the radially-inward direction are provided on an inner peripheral surface of the bonnet 47 to extend in axial directions, and the projecting portions 48 are provided at intervals in a circumferential direction. A pilot diaphragm 49 is disposed in the bonnet 47, and the inside of the bonnet 47 is partitioned into a spring chamber 50 and the communication chamber 44 in the valve holder 38 by the pilot diaphragm 49.

An upper surface of an outer peripheral portion of the pilot diaphragm 49 abuts on the cylindrical large diameter body 38a of the valve holder 38. A lower surface of the peripheral portion of the pilot diaphragm 49 abuts on a slip washer 48a which is pressed upward in the drawing from a lower surface side by the projecting portions 48. The slip washer 48a is made of annular resin. Thus, the outer peripheral portion of the pilot diaphragm 49 is sandwiched between the cylindrical large diameter body 38a and the slip washer 48a. The stem 51 is provided at a radially-center portion of the pilot diaphragm 49. The stem 51 is provided with a through hole 52 causing the valve chamber 42 to communicate with the spring chamber 50, and one end portion of the stem 51 is received in the communication hole 45. The stem 51 is provided with a disk portion 51a for covering a center portion of the pilot diaphragm 49 in the communication chamber 44. A reinforcing disk 53 is fixed by a nut 54 so as to face the disk portion 51a via the pilot diaphragm 49.

The pilot valve body 55 made of a steel ball is disposed in the valve chamber 42. A spring force is applied to the pilot valve body 55 by a pilot spring member 56 in a direction in which the communication hole 45 and the valve seat at the end portion of the stem 51 are closed. When the pilot valve body 55 abuts on the valve seat portion 41, the communication hole 45 is closed. The stem 51 has an end portion on the same side as valve chamber 42, this end portion serving as a valve seat on which the pilot valve body 55 abuts, and when the pilot valve body 55 abuts on the valve seat of the stem 51, the through hole 52 is closed. Note that FIG. 3 shows a condition in which both the communication hole 45 and the through hole 52 are closed. Air is allowed to pass through a clearance formed between the pilot valve body 55 and an inner wall of the cylindrical small diameter body 38b.

An adjusting screw member 57 is mounted to the end wall portion 47b of the bonnet 47 in a freely rotatable manner. A male screw 57a is provided at an inner end portion of the adjusting screw member 57, and a pressure regulating spring member 59 composed of a compression coil spring is mounted between a spring seat 58 fixed to the male screw 57a by thread connection and the reinforcing disk 53. The pilot diaphragm 49 is applied with thrust directed upward in the drawing by the pressure regulating spring member 59. The pilot diaphragm 49 is applied with thrust directed downward in the drawing by the pilot pressure of the communication chamber 44, the primary pressure of the valve chamber 42, and the pilot spring member 56. The position of the stem 51 in the axial direction is set by a balance of the upward and downward thrusts.

As shown in FIG. 3, when the stem 51 moves upward so as to separate the pilot valve body 55 from the valve seat portion 41, the pilot pressure chamber 33 communicates with the primary port 11 via the communication chamber 44, a clearance gap between an inner peripheral surface of a stem upper end small diameter portion and the communication hole 45, the valve chamber 42, and the pilot flow path 43. With this arrangement, the pilot pressure in the pilot pressure chamber 33 comes closer to the pressure of the primary port 11. Since the valve seat at the end portion of the stem 51 abuts the pilot valve body 55, the through hole 52 is closed. Therefore, the valve chamber 42 and the communication chamber 44 are prevented from being exposed to the spring chamber 50, that is, to the atmosphere. In contrast, when the stem 51 is separated from the pilot valve body 55, the valve chamber 42 is closed by the pilot valve body 55 which contacts the valve seat portion 41. Furthermore, since the valve seat at the end portion of the stem 51 and the pilot valve body 55 separate, the communication chamber 44 communicates with the spring chamber 50 via the through hole 52 of the stem 51. With this arrangement, the pilot pressure chamber 33 communicates with the spring chamber 50 via the communication chamber 44 and the through hole 52. The spring chamber 50 communicates with the outside via a breathing hole 60 formed in the bonnet 47, and when the pilot pressure chamber 33 communicates with the spring chamber 50 via the through hole 52 and the communication hole 45, air in the pilot pressure chamber 33 is discharged to the outside, and the pilot pressure comes closer to the atmospheric pressure of the outside.

As shown in FIG. 3, when the upward and downward thrusts applied to the pilot diaphragm 49 become equal to each other, the pilot valve body 55 closes the communication hole 45 and the stem 51 abuts on the pilot valve body 55 to close the valve seat of the stem upper end, so that the pilot pressure is maintained at the set pressure. Therefore, the pilot pressure in the pilot pressure chamber 33 is adjusted by adjusting a compression stroke of the pressure regulating spring member 59 provided between the spring seat 58 and the pilot diaphragm 49, and by adjusting the spring force to be applied to the pilot diaphragm 49 by the pressure regulating spring member 59, and a secondary pressure of compressed air to be discharged to the secondary port 12 is set in accordance with the pilot pressure.

A handle 61 for rotating the adjusting screw member 57 is mounted to the outside of the bonnet 47. This handle 61 has a cylindrical portion 61a which covers an outer peripheral surface of the bonnet 47, and an end wall portion 61b integral with this portion. A fitting portion 62 which is fitted to an outer end portion 57b of the adjusting screw member 57 and slidable in an axial direction is provided to the end wall portion 61b of the handle 61. The outer end portion 57b is formed into a square in cross section, and the fitting portion 62 has an inner peripheral surface formed into a square in cross-section so as to correspond to the outer end portion 57b. Therefore, the adjusting screw member 57 is rotated by rotating the handle 61.

Figure 4:
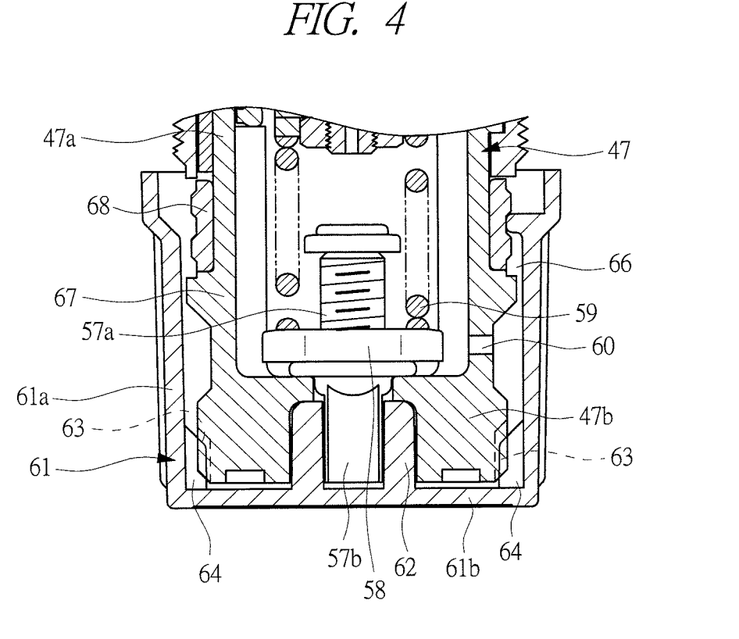
FIG. 4 is a sectional view showing a handle and a bonnet under the condition that the handle is at a lock position.

A plurality of engaging grooves 63 extending in the axial direction is formed in the circumferential direction on an outer peripheral surface of the end wall portion 47b of the bonnet 47, and engaging projections 64 which engage with the engaging grooves 63 are provided on an inner peripheral surface of the handle 61. As shown in FIG. 3, when the handle 61 is pulled, the engagement between the engaging projections 64 and engaging grooves 63 is released so that the handle 61 is located at a rotating position. In this rotating position, the handle 61 can be rotated around the bonnet 47. In contrast, as shown in FIG. 4, when the handle 61 is pressed in the axial direction towards the bonnet 47, the engaging projections 64 engage with the engaging grooves 63, so that the handle 61 is located at a locked position. In this locked position, the handle 61 is prevented from being rotated.

When an operator adjusts the secondary pressure, the handle 61 is moved to the rotating position shown in FIG. 3, and rotated. With this arrangement, the spring seat 58 for thread connection to the male screw 57a is moved in the axial direction of the adjusting screw member 57 so as to change the length of the pressure regulating spring member 59 in the axial direction, so that its spring force is adjusted. On the other hand, as shown in FIG. 4, when the handle 61 is moved to the locked position, the handle 61 is prevented from being carelessly rotated. As shown in FIGS. 1 and 2, the cylindrical portion 61a of the handle 61 is formed with an engaging portion 65 formed so as to elastically deform in a radial direction by having slits. As shown in FIG. 3, a tip end portion of the engaging portion 65 is formed with an engaging projection 66. The bonnet 47 is formed with a stopper 67, and when the handle 61 is moved to the rotating position, the stopper 67 engages with the engaging projection 66 and prevents the handle 61 from falling off.

Figure 6A:
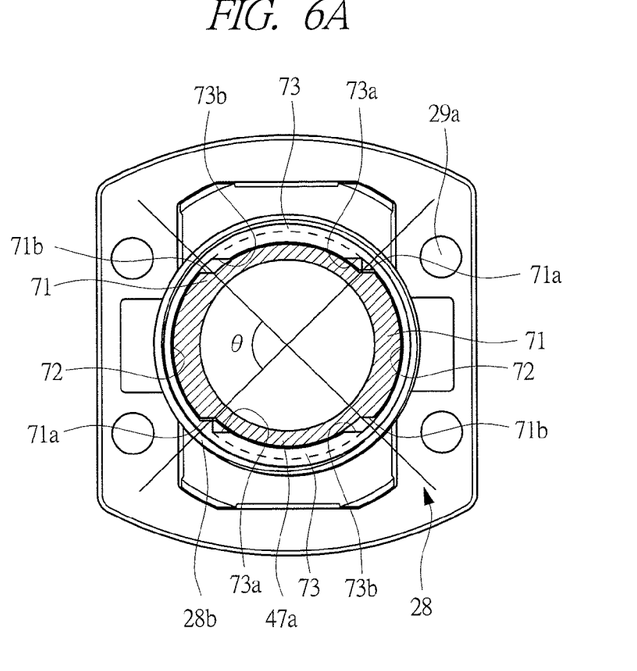
FIG. 6A is a sectional view taken along a line 6A-6A in FIG. 5 under the condition that the bonnet is inserted in the pressure regulating adapter.
Figure 6B:
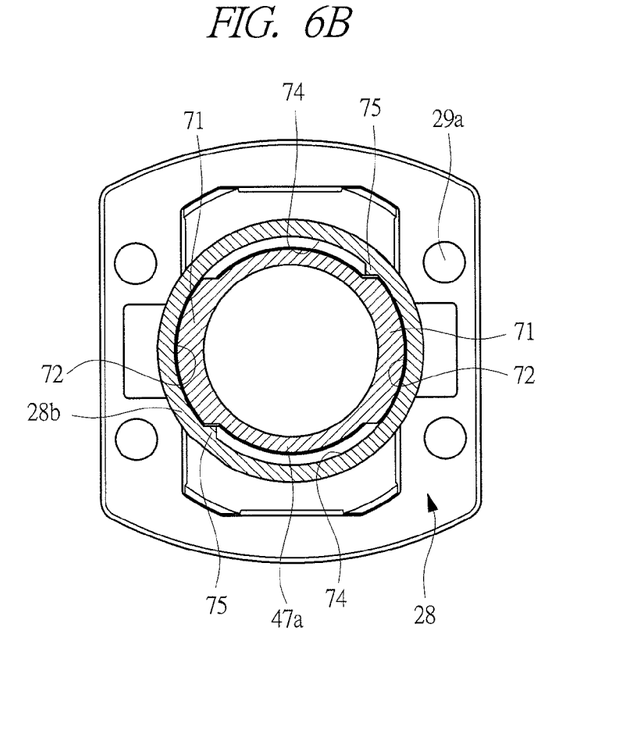
FIG. 6B is a sectional view taken along a line 6B-6B in FIG. 5 in the same state as that of FIG. 6A.

The bonnet 47 is provided with a handle-position indicating member 68, the handle-position indicating member 68 is formed by winding a belt-like member around the bonnet 47, and this member is different in color from the handle 61 and the bonnet 47. When the handle 61 is moved to a rotation position as shown in FIG. 3, the handle-position indicating member 68 is exposed to the outside as shown in FIGS. 1 and 2A. On the other hand, when the handle 61 is moved to a lock position as shown in FIGS. 2B, 6A, and 6B, the handle-position indicating member 68 is covered with the handle 61 and cannot be observed from the outside. By providing the handle-position indicating member 68 in this manner, an operator can clearly check from the outside whether the handle 61 is at the lock position or at the rotation position. The handle-position indicating member 68 is formed by winding a belt-like member in the above described manner; however, the handle-position indicating member 68 may be formed by providing a color on the outer peripheral surface of the bonnet 47. When the handle-position indicating member 68 is different in color from the handle 61 and the bonnet 47, the position of the handle 61 can be easily identified from the outside.

In order to set a secondary pressure by the above described internal pilot type pressure regulator, the handle 61 is rotated with the handle 61 being at the rotation position. Therefore, the spring force of the pressure regulating spring member 59 is adjusted, and the pilot pressure in the pilot pressure chamber 33 is adjusted. The secondary pressure supplied to the secondary port 12 is set by the pilot pressure.

FIG. 5 is a perspective view showing the pressure regulating adaptor and the bonnet which is not in an introduced state. FIG. 6A is a sectional view taken along a line 6A-6A of FIG. 5 with the bonnet is in an introduced state in the pressure regulating adaptor, and FIG. 6B is a sectional view taken along a line 6B-6B of FIG. 5 in a similar state of FIG. 5A.

The bonnet 47 is detachably mounted to the cylindrical mounting portion 28b of the pressure regulating adaptor 28 as described above. As shown in FIG. 5, outward projecting portions 71, which projects in the radially outward direction, are provided on the outer peripheral surface of the bonnet 47 so as to be extended in the circumferential direction thereof. The outward projecting portions 71 are provided at two locations so that the phases thereof are mutually shifted by an angle of 180 degrees in the circumferential direction, and each of the outward projecting portions 71 is provided within the range of an angle q in the circumferential direction of the bonnet 47 as shown in FIG. 6A. The angle q between end faces 71a and 71b of the outward projecting portions 71 is about 90 degrees. On the inner peripheral surface of the cylindrical mounting portion 28b of the pressure regulating adaptor 28, guide concave portions 72, which guide the axial-direction movement of the outward projecting portions 71 when the bonnet 47 is inserted in the pressure regulating adaptor 28, are formed. The inner diameter of the guide concave portions 72 is set to be slightly larger than the outer diameter of the outer peripheral surface of the outward projecting portion 71 the outer peripheral surface of the outward projecting portion 71 so that the bonnet 47 can be smoothly inserted in the pressure regulating adaptor 28.

As shown in FIG. 5, inward projecting portions 73, which project in the radially inward direction, are provided on end portions of the cylindrical mounting portion 28b so as to extend in the circumferential direction. The inward projecting portions 73 are provided at two locations so that they are mutually shifted in phase by an angle of 180 degrees in the circumferential direction at portions between the outward projecting portions 71. The angle between both end faces 73a and 73b of the inward projecting portions 73 is an angle smaller than the angle q of the outward projecting portion 71.

Figure 7A:
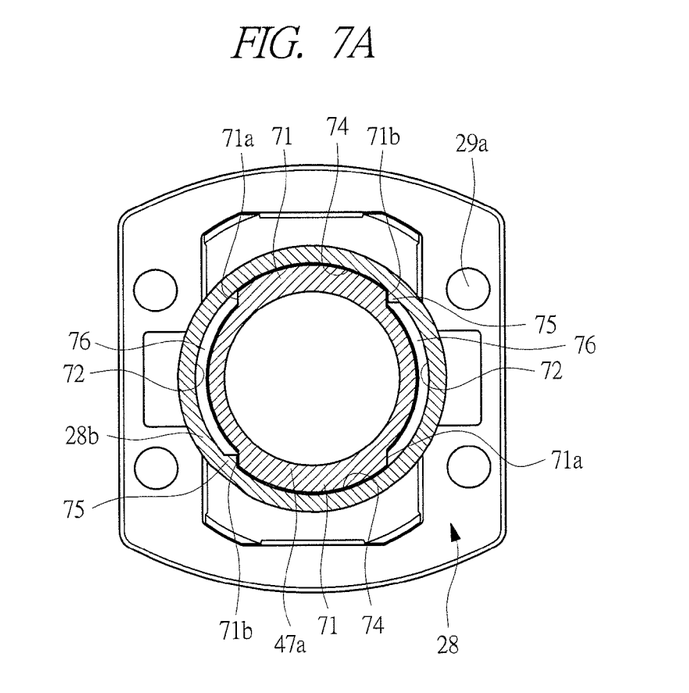
FIG. 7A is a sectional view showing the pressure regulating adapter under the condition that the bonnet is in a state rotated by an angle of 90 degrees from the state shown in FIGS. 6A and 6B.

On the axially inside of each of the inward projecting portions 73, a locking concave portion 74 is formed to be continued to a circumferential-direction first end side of the guide concave portion 72. The inner diameter of the locking concave portion 74 is the same as that of the guide concave portion 72, and the width of the locking concave portion 74 is set to be somewhat larger than that of the outward projecting portion 71. Therefore, when the bonnet 47 is inserted in the cylindrical mounting portion 28b while the circumferential-direction positions of the outward projecting portions 71 are caused to match the positions of the guide concave portions 72 as shown in FIG. 5, the outward projecting portions 71 is received in the guide concave portions 72, as shown in FIGS. 6A and 6B. When the bonnet 47 is rotated by about 90 degrees, in other words, one-quarter clockwise in FIGS. 6A and 6B in this state, the outward projecting portions 71 are respectively received in the locking concave portions 74, as shown in FIG. 7A. Therefore, the outward projecting portions 71 are engaged with the inward projecting portions 73, and removal of the bonnet 47 is prevented. Since the spring force of the pressure regulating spring member 59 is applied to the bonnet 47 in this state, the outward projecting portions 71 are pushed against the inward projecting portions 73.

Stoppers 75, which abut on the end faces 71b of the outward projecting portions 71, are provided on the inner peripheral surface of the cylindrical mounting portion 28b of the pressure regulating adaptor 28, and the rotation angle of the bonnet 47 is regulated by the stoppers 75.

Figure 7B:
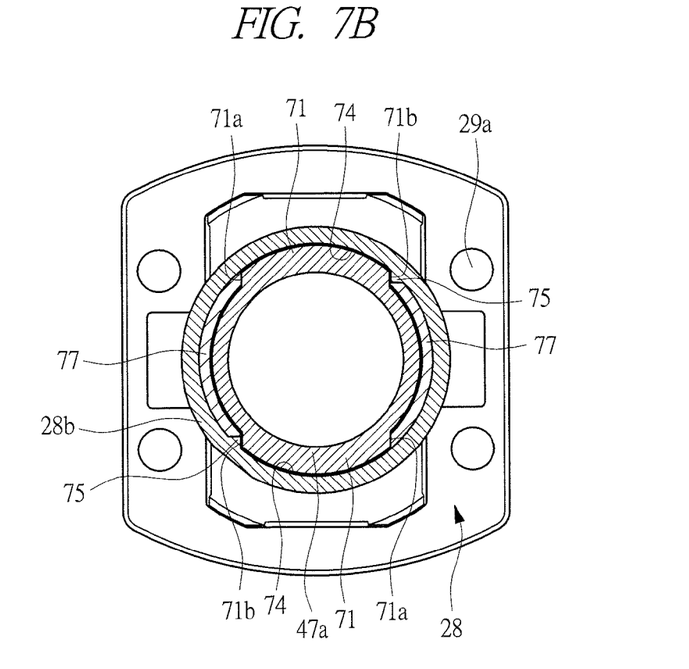
FIG. 7B is a sectional view showing the pressure regulating adapter under the condition that a lock member is inserted in a gap shown in FIG. 7A.

With the outward projecting portions 71 being received in the locking concave portions 74 and abutting on the inward projecting portions 73 as shown in FIG. 7A, arc gaps 76 are formed by the inner peripheral surfaces of the guide concave portions 72, the outer peripheral surface of the cylindrical portion 47a of the bonnet 47, the end faces 71a of the outward projecting portions 71, and the stoppers 75. As shown in FIG. 7B, lock members 77 having arc shapes in transverse cross section are inserted in the gaps 76. When the lock members 77 are inserted, the circumferential-direction first-side lateral faces of the lock members 77 abut on the end faces 71a of the outward projecting portions 71, and the other lateral faces thereof abut on the stoppers 75; therefore, the bonnet 47 is prevented from being rotated with respect to the pressure regulating adaptor 28.

Figure 8A:
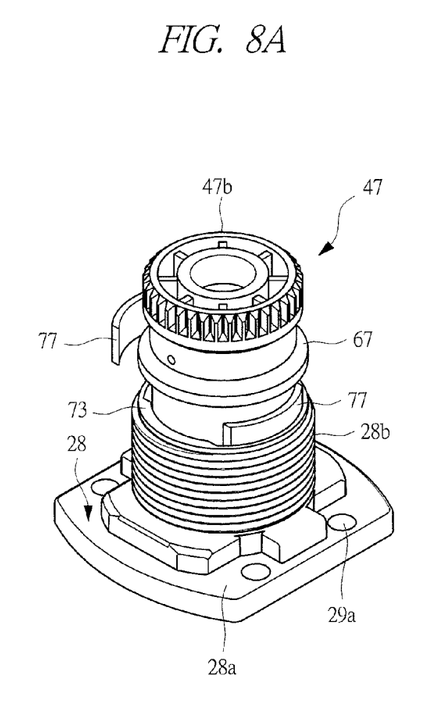
FIG. 8A is a perspective view showing the pressure regulating adapter and the bonnet under the condition that the lock member is in an inserted state.
Figure 8B:
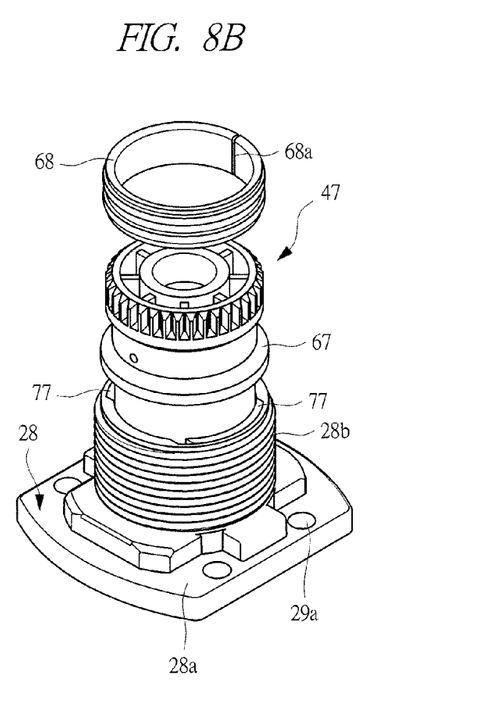
FIG. 8B is a perspective view showing the pressure regulating adapter and the bonnet under the condition that the handle-position indicating member is in an attached state.
Figure 9:
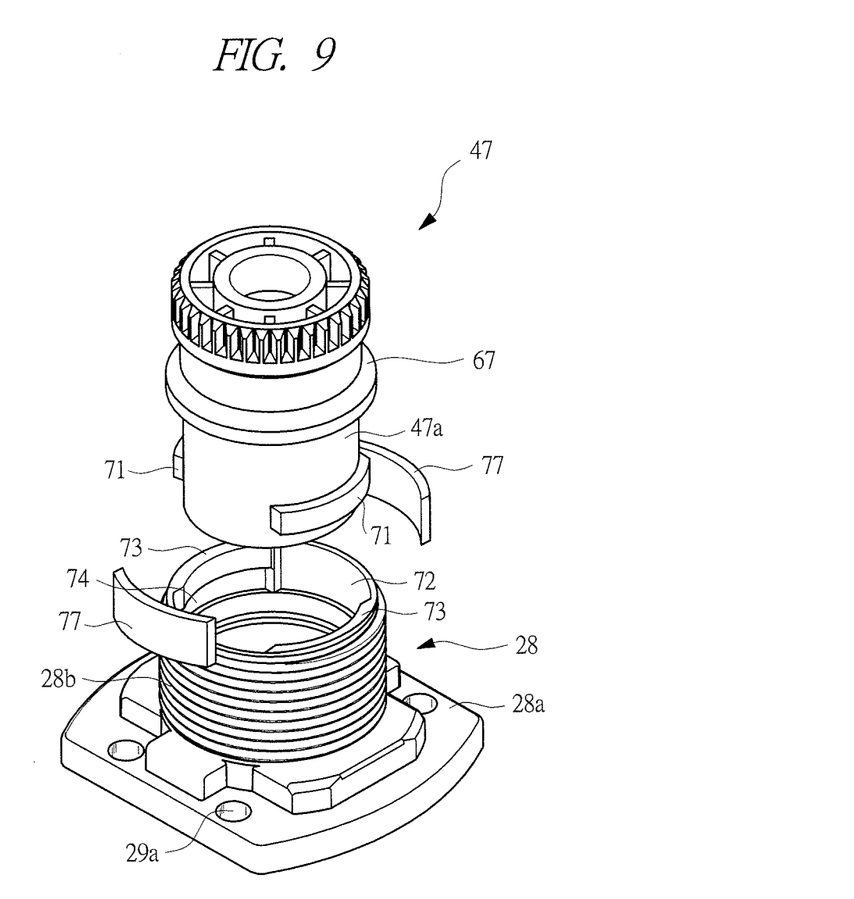
FIG. 9 is an exploded perspective view showing the pressure regulating adapter and the bonnet to show a positional relationship between the projecting portion provided to the bonnet and the lock member.

FIG. 8A shows an inserting process of the lock members 77, and FIG. 8B shows an inserted state of the lock members 77. In this manner, the bonnet 47 is mounted to the pressure regulating adaptor 28 by the inserting operation of the bonnet 47 into the pressure regulating adaptor 28 in the axial direction and the rotating operation of the bonnet 47 by a slight angle which is less than one rotation. Furthermore, when the lock members 77 are inserted, the bonnet 47 is prevented from being rotated, and goes into a locked state. As shown in FIG. 8B, the handle-position indicating member 68 is formed of an annularly-formed belt-like resin member provided with a gap 68a. When the handle-position indicating member 68 is mounted on the outside of the bonnet 47 while expanding the incision 68a after inserting the lock members 77, the handle-position indicating member 68 abuts on the lock members 77. Therefore, the lock members 77 can be prevented by the handle-position indicating member 68 from being detached. In this manner, the handle-position indicating member 68 also functions as an annular fall preventing member which prevents the lock members 77 from being moved in the axial direction and falling.

Therefore, compared with the conventional case in which the bonnet 47 is mounted on the pressure regulating adaptor 28 by using screw members, or compared the conventional case in which the bonnet 47 and the pressure regulating adaptors 28 are coupled by thread connection, the bonnet 47 can be easily attached/detached to/from the pressure regulating adaptor 28 in a short period of time, and the operability thereof is enhanced. Therefore, an assembling operation of the internal pilot type pressure regulator and a replacing operation of the pilot diaphragm 49 in the bonnet 47 can be quickly carried out.

As shown in FIG. 1, port plugs 78 are mounted on left/right both lateral faces of the port block 13. The port plugs 78 are used for closing communication ports formed so as to communicate with the secondary ports 12. If one of the port plugs 78 is detached therefrom and a pressure gauge is mounted instead of that, it is possible to constitute a pressure regulator provided with the pressure meter.

The present invention is not limited to the above embodiment, and various modifications can be made within a range not departing from the gist thereof. For example, although the two outward projecting portions 71 and the two inward projecting portions 73 are provided, the numbers thereof can be arbitrarily set.

INDUSTRIAL APPLICABILITY

This internal pressure regulator may be applied to an air pressure supply system for supplying pressured air to a pneumatic equipment.

What is claimed is:
1. An internal pilot type pressure regulator comprising:
a port block which is formed with: a primary port to which compressed air is supplied; and a secondary port which communicates with the primary port via a first communication hole, pressure-regulated compressed air flowing out from the secondary port, wherein a main valve shaft provided with a main valve body which opens and closes the first communication hole is mounted in the first communication hole so as to be movable in an axial direction thereof;
a pressure regulating adaptor which is detachably mounted on the port block, wherein a main valve diaphragm partitioning and forming a secondary pressure chamber communicating with the secondary port and a pilot pres- sure chamber on the other side is fixed between the pressure regulating adaptor and the port block;

a bonnet which is provided with a cylindrical portion, wherein the bonnet is detachably mounted on a cylindrical mounting portion of the pressure regulating adaptor, a pilot diaphragm opening and closing a pilot valve body opening and closing a second communication hole causing the pilot pressure chamber and the primary port to communicate with each other, and a pressure regulating spring member regulating the pilot pressure in the pilot pressure chamber are incorporated in the cylindrical portion;

an outward projecting portion which is provided integrally on an outer peripheral surface of the cylindrical portion of the bonnet so as to project in a radially outward direction toward an inner surface of the cylindrical mounting portion of the pressure regulating adaptor;

an inward projecting portion which is provided integrally on the inner surface of the cylindrical mounting portion of the pressure regulating adaptor so as to project toward the outer surface of the cylindrical portion of the bonnet, wherein when the bonnet is inserted in the pressure regulating adaptor in an axial direction thereof and then rotated, the inward projecting portion abuts on the outward projecting portion; and an arc-shaped lock member which is axially inserted in an arc-shaped gap that is defined between the inner surface of the cylindrical mounting portion of the pressure regulating adaptor and the outer surface of the cylindrical portion of the bonnet, so that the lock member intervenes between the outward projecting portion and a stopper provided integrally on the inner surface of the cylindrical mounting portion.

2. The internal pilot type pressure regulator according to claim 1, comprising an annular fall preventing member which prevents the lock member from being moved and falling in the axial direction.

3. The internal pilot type pressure regulator according to claim 2, wherein the bonnet is provided with an adjusting screw member which is screwed and coupled to a spring receiving member retaining the pressure regulating spring member between the spring receiving member and the pilot diaphragm, and which is rotatably with respect to the bonnet;

a handle, which has an end wall portion fitted to the adjusting screw member and a cylindrical portion covering an outer periphery of the bonnet, is mounted on an outside of the bonnet so as to be reciprocable between a lock position and a rotation position in the axial direction, wherein when the handle is pushed against the bonnet in the axial direction at the lock position, the handle is engaged with the bonnet to prevent rotation of the handle, and when the handle is pulled from the bonnet in the axial direction at the rotation position, the handle is rotatable, and a handle-position indicating member, which is exposed to an outside when the handle is at the rotation position and which is covered with the handle when the handle is at the lock position, is provided on the outer surface of the bonnet.

4. The internal pilot type pressure regulator according to claim 3, wherein the handle-position indicating member prevents the lock member from being moved in an axial direction.

5. The internal pilot type pressure regulator according to claim 1, wherein the bonnet is provided with the two outward projecting portions, the pressure regulating adaptor is provided with the two inward projecting portions corresponding to the number of the outward projecting portions, and when approximately one-quarter rotation of the bonnet is performed after inserting the bonnet in the pressure regulating adaptor, the outward projecting portions abut on the respective inward projecting portions.

6. The internal pilot type pressure regulator according to claim 5, wherein the bonnet is provided with an adjusting screw member which is screwed and coupled to a spring receiving member retaining the pressure regulating spring member between the spring receiving member and the pilot diaphragm, and which is rotatably with respect to the bonnet;

a handle, which has an end wall portion fitted to the adjusting screw member and a cylindrical portion covering an outer periphery of the bonnet, is mounted on an outside of the bonnet so as to be reciprocable between a lock position and a rotation position in the axial direction, wherein when the handle is pushed against the bonnet in the axial direction at the lock position, the handle is engaged with the bonnet to prevent rotation of the handle, and when the handle is pulled from the bonnet in the axial direction at the rotation position, the handle is rotatable, and a handle-position indicating member, which is exposed to an outside when the handle is at the rotation position and which is covered with the handle when the handle is at the lock position, is provided on the outer surface of the bonnet.

7. The internal pilot type pressure regulator according to claim 6, wherein the handle-position indicating member prevents the lock member from being moved in an axial direction.

* * * * *